United States Patent
Chai et al.

(10) Patent No.: US 10,649,848 B2
(45) Date of Patent: *May 12, 2020

(54) CHECKPOINT AND RESTART

(71) Applicant: INTERNATIONAL BUSINESS MACHINES CORPORATION, Armonk, NY (US)

(72) Inventors: Hua Chai, Beijing (CN); Jun He, Beijing (CN); Christophe Lombard, Saint Paul de Vence (FR)

(73) Assignee: International Business Machines Corporation, Armonk, NY (US)

(*) Notice: Subject to any disclaimer, the term of this patent is extended or adjusted under 35 U.S.C. 154(b) by 218 days.

This patent is subject to a terminal disclaimer.

(21) Appl. No.: 15/840,286

(22) Filed: Dec. 13, 2017

(65) Prior Publication Data
US 2018/0113763 A1   Apr. 26, 2018

Related U.S. Application Data

(63) Continuation of application No. 14/450,488, filed on Aug. 4, 2014, now Pat. No. 9,910,734.

(30) Foreign Application Priority Data

Sep. 2, 2013 (GB) .................................. 1315576.7

(51) Int. Cl.
*G06F 11/14* (2006.01)
*G06F 16/11* (2019.01)

(52) U.S. Cl.
CPC ........ *G06F 11/1415* (2013.01); *G06F 16/128* (2019.01); *G06F 11/1438* (2013.01)

(58) Field of Classification Search
None
See application file for complete search history.

(56) References Cited

U.S. PATENT DOCUMENTS

| 7,475,274 B2 | 1/2009 | Davidson |
| 7,613,749 B2 | 11/2009 | Flynn, Jr. et al. |
| 7,792,983 B2 | 9/2010 | Mishra et al. |
| 7,945,808 B2 | 5/2011 | Coppinger et al. |
| 8,099,627 B1 | 1/2012 | Shah et al. |
| 2006/0236152 A1 | 10/2006 | Archer et al. |
| 2009/0217021 A1 | 8/2009 | Goodson et al. |

(Continued)

FOREIGN PATENT DOCUMENTS

GB       2517780 A       3/2015

OTHER PUBLICATIONS

Cores et al., "Checkpoint Size Reduction in Application-level Fault Tolerant Solutions", Actas de las XXII Jornadas de Paralelismo, pp. 713-718, La Laguna (Tenerife, Spain), Sep. 2011.

(Continued)

*Primary Examiner* — Amresh Singh
(74) *Attorney, Agent, or Firm* — Dmitry Paskalov

(57) ABSTRACT

A method of performing a checkpoint on a set of connected processors and memories comprises the steps of creating one or more statefiles for one or more of the processors, querying available processing and/or memory resources, allocating data from one or more statefiles to the available resources, compressing the allocated data, storing the compressed data, and repeating the querying, allocating, compressing and storing steps until all of the statefile(s) are compressed and stored.

17 Claims, 7 Drawing Sheets

(56) References Cited

U.S. PATENT DOCUMENTS

| | | |
|---|---|---|
| 2010/0070678 A1 | 3/2010 | Zhang et al. |
| 2010/0122199 A1 | 5/2010 | Darrington et al. |
| 2011/0167195 A1 | 7/2011 | Scales et al. |
| 2012/0246638 A1 | 9/2012 | He et al. |
| 2014/0214770 A1 | 7/2014 | Kannan et al. |
| 2015/0066880 A1 | 3/2015 | Chai et al. |

OTHER PUBLICATIONS

Cores et al., "Failure Avoidance in MPI Applications Using an Application-Level Approach", The Computer Journal, (2014), 57, (1): 100-114, First published online: Dec. 18, 2012, 2 pages.

GB Search Report, Application No. GB1315576.7, dated Feb. 5, 2014, 3 pages.

Chai et al., "Improved Checkpoint and Restart", United Kingdom Application No. 1315576.7, filed Sep. 2, 2013, 20 pages.

Chai et al., "Improved Checkpoint and Restart", U.S. Appl. No. 15/840,235, filed Dec. 13, 2017.

List of IBM Patents and Patent Applications Treated as Related. Filed Dec. 13, 2017. 2 pages.

CHECKPOINT AND RESTART

FIELD OF THE INVENTION

This invention relates to a method of, and system for, performing a checkpoint.

BACKGROUND

With the rapid development of high performance computing (HPC) software and hardware, supercomputing has entered into the petascale HPC era. Given the size of high-end large-scale clusters common in such supercomputers, fault tolerance becomes an essential design factor for which HPC creators have to consider a user production environment, because of the known mean time between failures (MTBF) issues which dramatically drop in the very large scale parallel computing. Currently checkpoint/restart is the mainstream approach applied by the leading HPC vendors.

For example, the IBM HPC software stack provides a container-virtualization-based checkpoint/restart function as a solution to fault-tolerance. This mechanism is a lightweight checkpoint technique when compared against other system-level checkpoint methods. A process such as IBM MDCR (Metacluster Distributed Checkpoint/Restart) is distributed middleware, working with the IBM parallel environment, and is capable of spawning parallel application programs in containers in order to manage or control the containers to checkpoint or restart in runtime, if MDCR gets such a request from the resource manager. In particular, the IBM checkpoint/restart processing is transparently and automatically running without any changes to parallel program code.

In a high-end HPC cluster, nevertheless, during the running of a full-size parallel application, if checkpoint is performed, the checkpoint statefiles will produce a very large amount of data, which will easily breakdown or slowdown a robust high performance global shared file system. This creates a paradox; on the one hand, checkpoint is more and more inevitable in ultra-large scale HPC clusters, and on the other hand, for a full-size parallel application, the checkpoint solution suffers from the massive data of statefiles, which makes it impractical.

BRIEF SUMMARY OF THE INVENTION

According to a first aspect of the present invention, there is provided a method of performing a checkpoint on a set of connected processors and memories, the method comprising the steps of creating one or more statefiles for one or more of the processors, querying available processing and/or memory resources, allocating data from one or more statefiles to the available resources, compressing the allocated data, storing the compressed data, and repeating the querying, allocating, compressing and storing steps until all of the statefile(s) are compressed and stored.

According to a second aspect of the present invention, there is provided a system for performing a checkpoint on a set of connected processors and memories, the system arranged to create one or more statefiles for one or more of the processors, query available processing and/or memory resources, allocate data from one or more statefiles to the available resources, compress the allocated data, store the compressed data, and repeat the querying, allocating, compressing and storing actions until all of the statefile(s) are compressed and stored.

According to a third aspect of the present invention, there is provided a computer program product for performing a checkpoint on a set of connected processors and memories, the computer program product comprising one or more computer-readable storage devices and program instruction which are stored on the one or more storage devices and when executed by one or more processors, perform the steps of creating one or more statefiles for one or more of the processors, querying available processing and/or memory resources, allocating data from one or more statefiles to the available resources, compressing the allocated data, storing the compressed data, and repeating the querying, allocating, compressing and storing instructions until all of the statefile(s) are compressed and stored.

Owing to the invention, it is possible to provide an efficient and effective method of reducing the amount of data that needs to be stored during a checkpoint operation. Compressing the data decreases the concurrent statefiles size that are required to be written to the shared file system and the invention provides a practical mechanism to implement, which can be based on container virtualization. The invention is a scalable system and mechanism to implement transparently the online statefile compressing and decompressing during parallel job runtime, and the mechanism can be smoothly merged into an existing HPC software stack in a production environment. Particularly, the mechanism focuses more on performance awareness along with system resource utilization in an HPC cluster.

A practical checkpoint testing of a large-scale cluster, running a matrix/vector multiplication test case, consisting of sixteen tasks per node with four threads per task on 1470 nodes, will produce, for one checkpoint, individual statefiles (per node) of about 100 GB, with the total aggregate data about 150 TB. Such a huge amount of data introduces an I/O bottleneck for the checkpoint during the parallel job runtime. The goal is to reduce the size of each container's statefiles, and the core idea is to deliver an effective method that uses idle processor cores with the matched memory affinity to dynamically run on-line compression for the statefiles before saving them to a global shared file system, and vice versa to decompress the statefiles during restarting of the job.

Using the improved method, the total size of statefiles can be decreased by around 70% to 80%, depending on the application and node configuration. For example, the total statefile size of 150 TB (from the example above) would be dramatically reduced to around 30 TB. In other words, if the storage and shared file system is able to store 150 TB data in 25 minutes, which is the time for one checkpoint, the time to store the total compressed statefiles is improved by the enhanced methodology from 25 minutes to 5 minutes, in the optimal case. This is very meaningful and valuable improvement for the fault-tolerance of parallel applications in a large-scale supercomputer cluster.

Preferably the step of querying the available processing and/or memory resources comprises ascertaining the available processing resources and setting a compression ratio according to the ascertained available processing resources and/or ascertaining the available memory resources and setting a buffer length according to the ascertained available memory resources. The checkpoint process works, in the preferred embodiment, by compressing the statefile data using as much of the available resources (CPU and memory) as possible to compress the statefile data chunk by chunk. In this way an efficient compression of the statefile data is achieved that will use the maximum available resources, without preventing concurrent tasks from being carried out.

BRIEF DESCRIPTION OF THE DRAWINGS

Preferred embodiments of the present invention will now be described, by way of example only, with reference to the following drawings, in which.

DETAILED DESCRIPTION OF THE DRAWINGS

Figure 1:
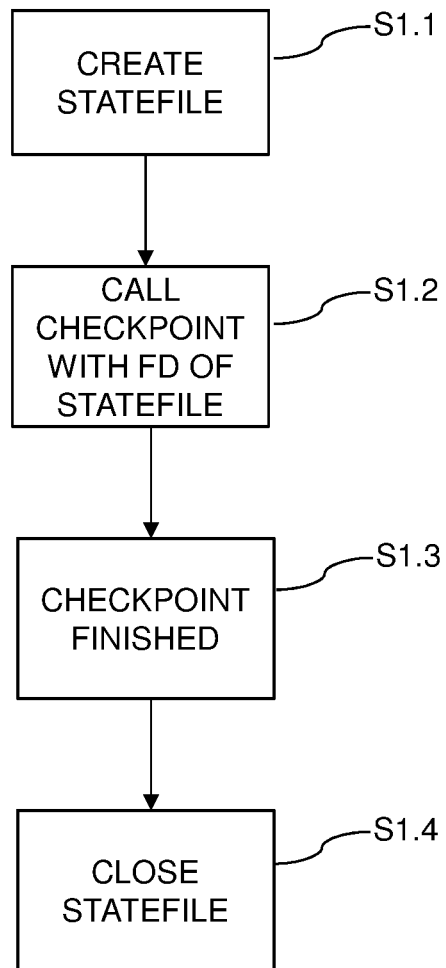
FIG. 1 is a flowchart illustrating a prior art checkpoint process.
Figure 2:
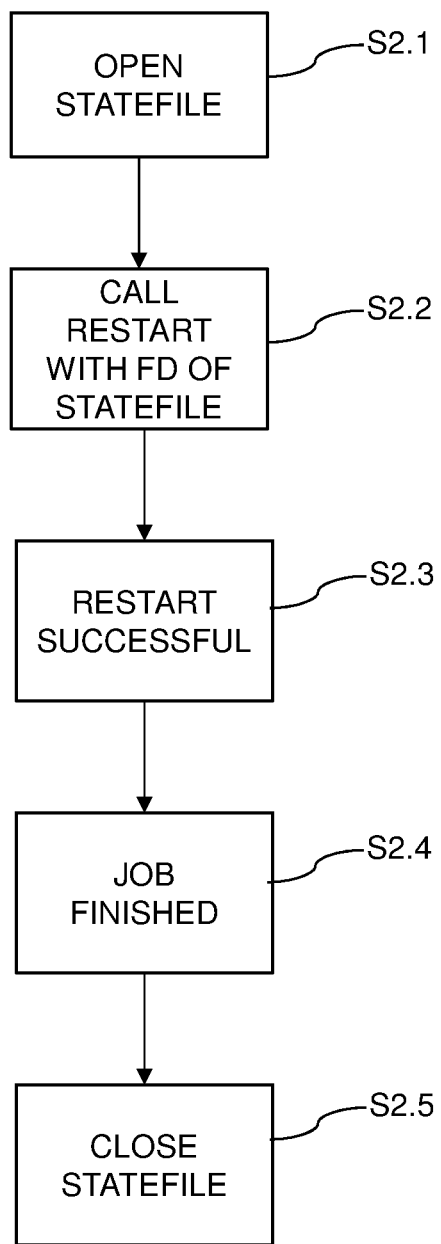
FIG. 2 is a flowchart illustrating a prior art restart process.

Illustrated in FIGS. 1 and 2 are a pair of flowcharts demonstrating existing checkpoint/restart processes, in relation to an HPC software stack. The checkpoint is assumed to be performed on a set of connected processors and memories, running one or more applications, where most likely each processor has a dedicated local memory. A resource manager, which is connected to the processors, co-ordinates the execution of the checkpoint process. The prior art checkpoint process, which is shown in FIG. 1 operates by creating a statefile (step S1.1), calling the checkpoint command with the file descriptor (FD) of the statefile, which copies the current state of the application(s) to the statefile (step S1.2), completing the checkpoint (step S1.3) and closing the statefile (step S1.4).

The prior art restart process, which is shown in FIG. 2, operates in essentially the same manner as the checkpoint process, but in reverse. The restart process firstly opens the statefile (step S2.1), calls the restart command with the file descriptor of the statefile (step S2.2), performs the restart and thereby copying back the image in the statefile (step S2.3), completes the restart (step S2.4) and then closes the statefile (step S2.5). In this way, if there is a failure within the set of processors, then this can be restored back to the last taken checkpoint using the restore process. Again, the resource manager that is connected to the set of processors is responsible for the correct execution of the restart process.

In the context of a container based HPC software stack, the HPC software stack reads statefiles during restarting. The middleware library used in the checkpoint/restart process directly invokes each container's utility tool by passing an open file descriptor, and then waits for the execution result of the utility tool. Once the result is received, the container stores the memory image into the statefiles identified by the file descriptor during the checkpoint process, and loads the statefiles into the container to execute during the restarting process. The resource manager operates the processes by communicating with the containers, executed on the different processors of the computing system. A single processor may be running multiple containers.

In contrast the prior art techniques, the new mechanism delivers an optimized mechanism to improve the procedure for checkpoint and restart. During a checkpoint, the content of a set of statefiles can be read and captured, then the online content is compressed before being saved to a global share file system. During the restart, the content is read from the compressed statefiles, decompressed and eventually written to the statefiles. In a preferred implementation, a child process is spawned to perform the compression/decompression operations with the file I/O operations in parallel.

For concurrent jobs, the resource manager is aware of the resources consumed by the tasks running on the nodes of the computing system. Before each compress/decompress operation, the process can rely on the resource manager to ascertain the optimal processor and/or memory to be used to compress/decompress for the current checkpoint, from the point of view of the whole cluster. Then, the process can use CPU/memory affinity for the child process to optimize the compress/decompress operation. The CPU/memory affinity can be dynamically specified to match the size of a compressing/decompressing buffer, according to the current resource consumption status. This makes the compress/decompress operations more efficient, and will prevent the compress/decompress operations from disturbing any other jobs running on the same node.

For a single job, the process can rely on a daemon that is privileged to query the CPU/memory utilization on each node, and the process can set optimal CPU/memory affinity for the checkpoint child process, if the machines are using NUMA architecture. In addition, the size of the compression buffer can be flexibly adjusted based on the available system memory, because the compression operation is agile to decrease the memory resource needed by using smaller data buffers to be compressed. If the current CPU utilization is busy, the compression operation should slow down the compression workload by decreasing the compress ratio. With the dynamic compression buffer size and the dynamic compression ratio, the compression operation is very adaptive to the scenarios in runtime, for both concurrent jobs and a single job.

Figure 3:
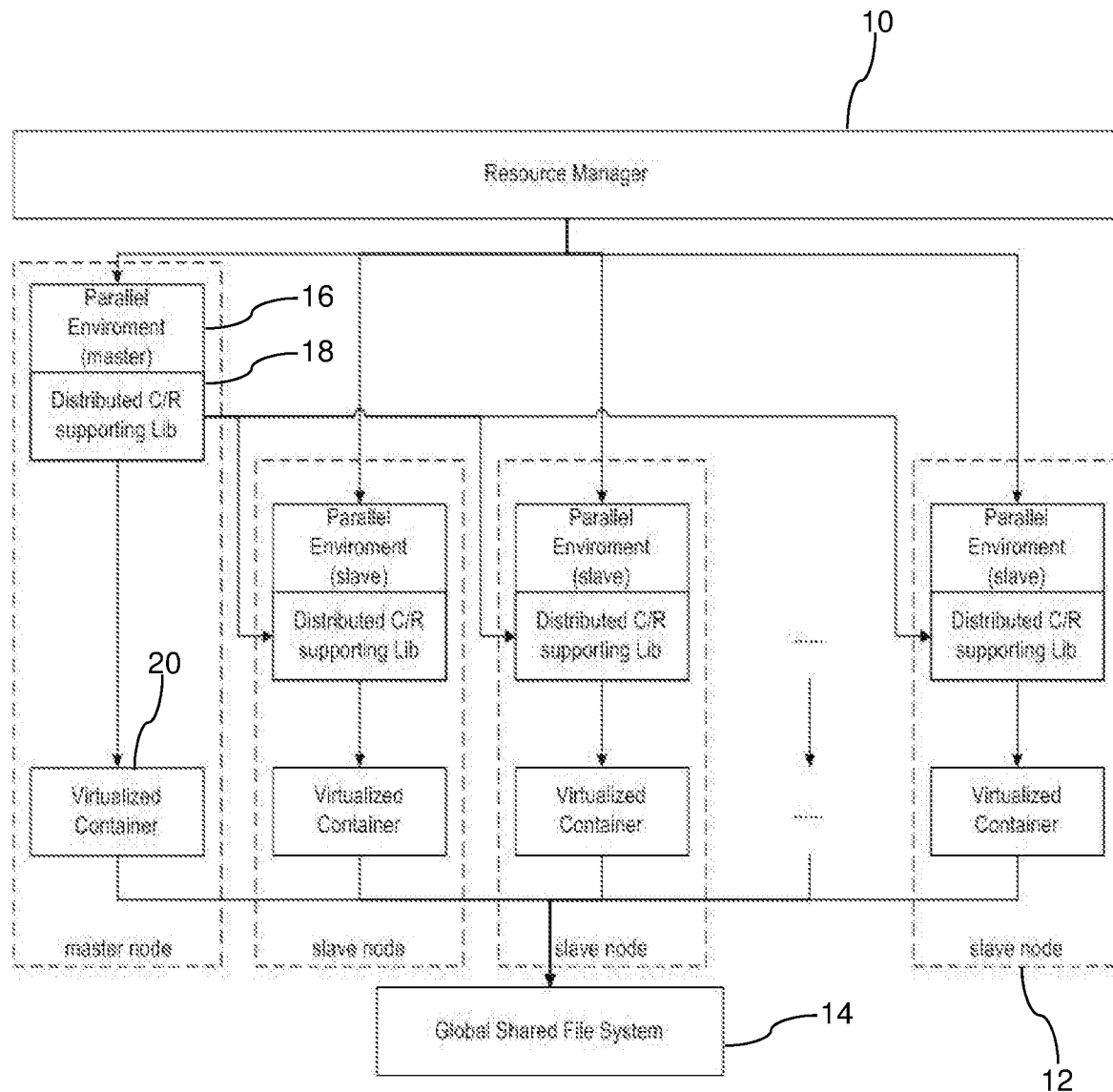
FIG. 3 is a schematic diagram of a computing system.

FIG. 3 illustrates the hierarchy of an HPC cluster system that uses checkpoint and restart. A resource manager 10 is connected to a plurality of nodes 12 and the nodes 12 are also connected to a global shared file system 14. One of the nodes 12 is designated as a master node 12 and the remaining nodes are designated as slave nodes 12. Each node 12 comprises a processor and a memory and the master node 12 is physically identical to the slave nodes 12. Each node 12 is running a parallel environment 16, a distributed checkpoint/restart supporting library 18 and a virtualised container 20. The resource manager 10 communicates with the master node 12 to organise the checkpoint and restart.

For the checkpoint process, the resource manager 10 will issue a command to the master parallel environment 16 on the master node 12. Then, C/R supporting library 18 on the master node 12 will communicate with the other C/R supporting libraries 18 on the slave nodes 12, who will then inform all the tasks inside the respective containers 20 to prepare for the global checkpoint. After all current tasks are ready, the C/R supporting library 18 per node 12 will invoke checkpoint command to checkpoint their container 20 to a statefile, and the statefile will be saved to the global share file system 14, in parallel. In this way, the checkpoint process is executed.

When performing the restarting process, the C/R supporting library 18 on each node 12 will invoke the restart command to recover the container 20, which means that all of the statefiles stored on the global share file system 14 will be read in parallel. After each container 20 on each node 12 is recovered, all of the tasks inside the containers 20 are resumed to run, but the tasks are globally blocked to wait co-ordination of the libraries 18. Once the task's network resource is ready to use, the library 18 on the master node 12 will broadcast to each library 18 to command all tasks to continuously execute. Consequently, the parallel job's tasks will completely resume running inside the containers 20.

Figure 4A:
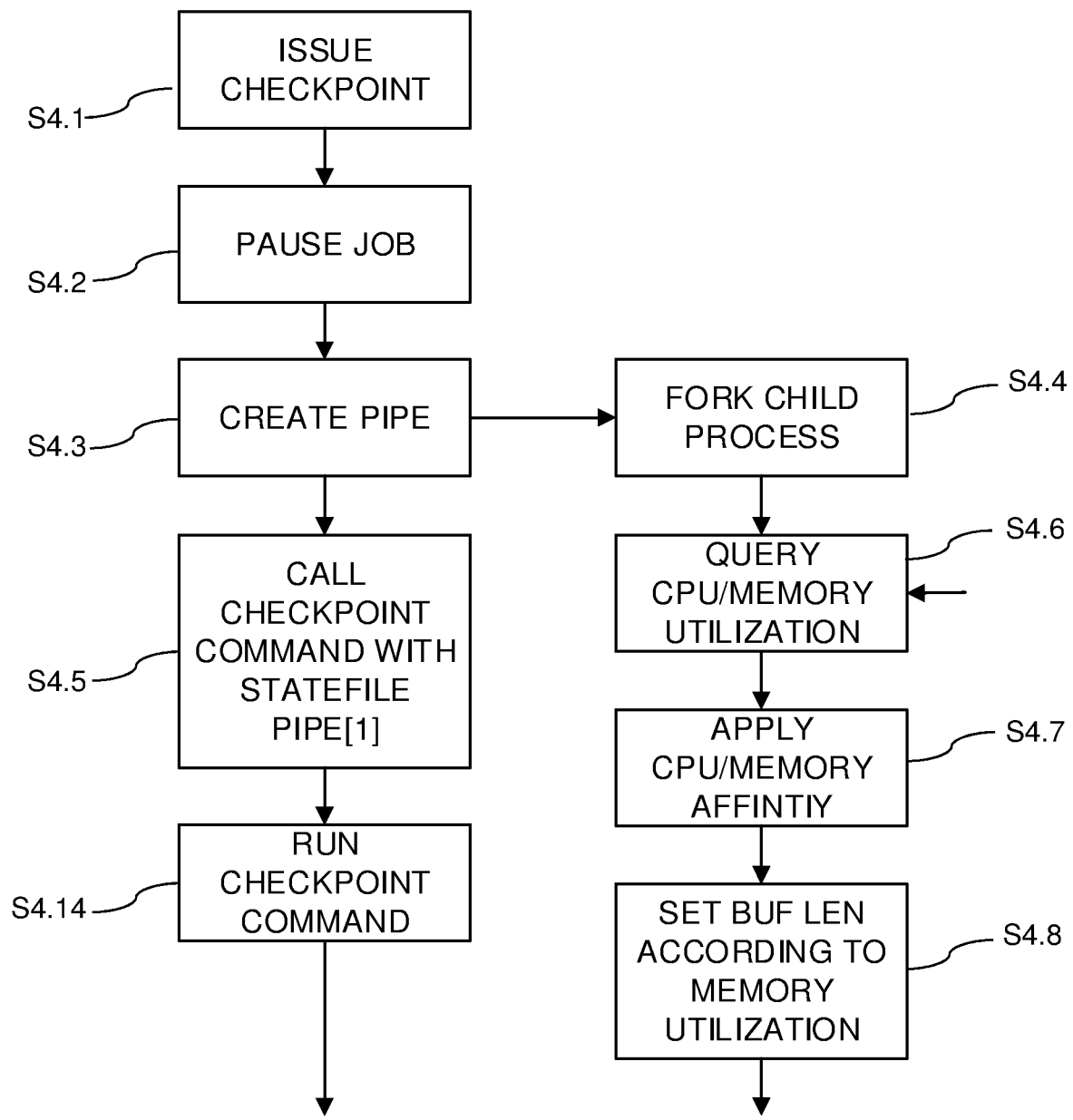
FIGS. 4a and 4b are a flowchart illustrating an improved checkpoint process.
Figure 4B:
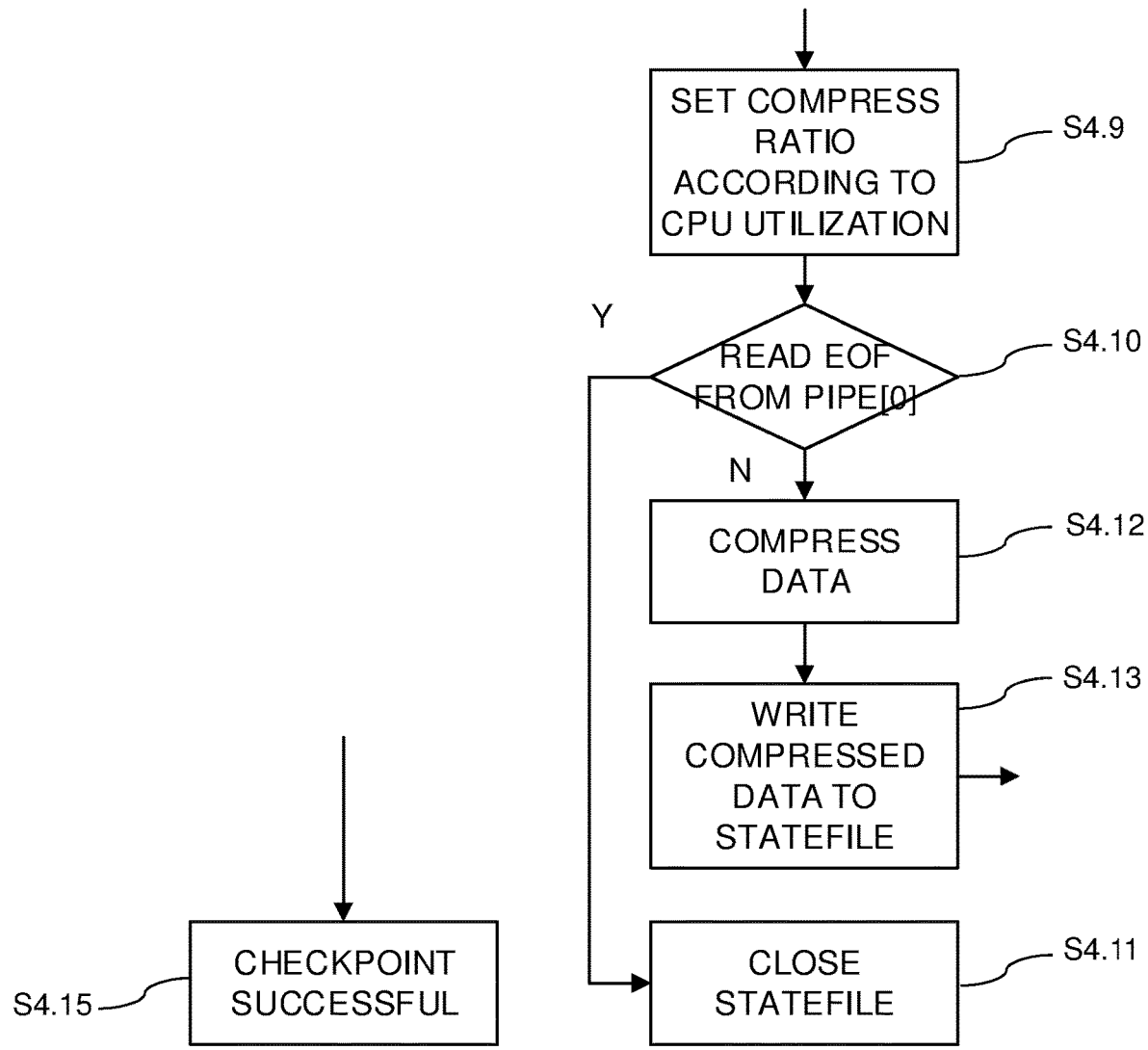

FIGS. 4a and 4b provide a detailed illustration of the improved checkpoint flow. In the existing process, the resource manager issues the checkpoint command, the library co-ordinates the preparation of the job and just straightforwardly calls the checkpoint command, which is then executed by the containers. In the improved mechanism, as described above, the content of statefiles will be compressed during the checkpoint, and the compressed statefiles can be decompressed when restarting. Each compress/decompress operation can be optimized by setting CPU/memory affinity according to the CPU/memory utilization information from the resource manager. In addition, a memory buffer can be dynamically adjusted based on the memory utilization on the nodes, and the compression ratio is automatically changed by querying the CPU utilization.

The steps of the process are as follows: At step S4.1, the resource manager issues a checkpoint. At step S4.2, the C/R supporting library co-ordinates the whole job to prepare and block the job to wait for the checkpoint command. At step S4.3, the library creates a pipe and concurrently at step S4.4 the library forks a child process. At step S4.5, the library invokes the checkpoint command by passing in the opened pipe[1]. At step S4.6, in the forked child process being run by the library, there is queried the CPU/memory utilization from the resource manager. At step S4.7, the child process applies CPU/memory affinity. At step S4.8, the child process sets the buffer length used for the compression, depending on the memory utilization on the node. At step S4.9, the child process sets a compress ratio according to the current CPU utilization. One way to set the compress ratio is to use different lossless data compression algorithms according to the current CPU utilization. In one embodiment, three levels of expected compression ratios are used. If the current CPU utilization is high, the application will set the expected compression ratio as low by using a simple form of data compression that does not require a great deal of CPU time, such as a run-length encoding algorithm. Compression algorithms based on run-length encoding are simple and quick, but the compression ratios achieved are not as good as other lossless compression algorithms. If the current CPU utilization is intermediate, the application will set the compression ratio as average by using a compression algorithm, such as a dictionary compression algorithm, that while requiring greater CPU utilization can achieve greater compression ratios than the algorithm used when the expected compression ratio is low. If the current CPU utilization is low, the application will set the expected compression ratio as high by using a compression algorithm, such as an algorithm based on arithmetic coding, that while requiring greater CPU utilization can achieve greater compression ratios than the algorithms used when the expected compression ratio is average. An algorithm based on arithmetic coding is the most complex coding method among the three kinds of coding methods used. A compression algorithm based on arithmetic coding should get the best compression ratios but takes more computing resources thus taking more computing time.

At step S4.10, once the child process detects an EOF (end of file) from the pipe[0], the child process will close the statefile at step S4.11 and exit. If the child process is still able to read data from pipe[0] successfully, this means the checkpoint tool is in the process of writing to the statefile and at step S4.12 the child process compresses the data using the determined ratio. At step S4.13, the child process saves the compressed data to the statefile, and returns to step S4.6. Concurrently with the child process, the virtualised container tool, at step S4.14 runs the checkpoint command and completes the checkpoint at step S4.15.

Figure 5:
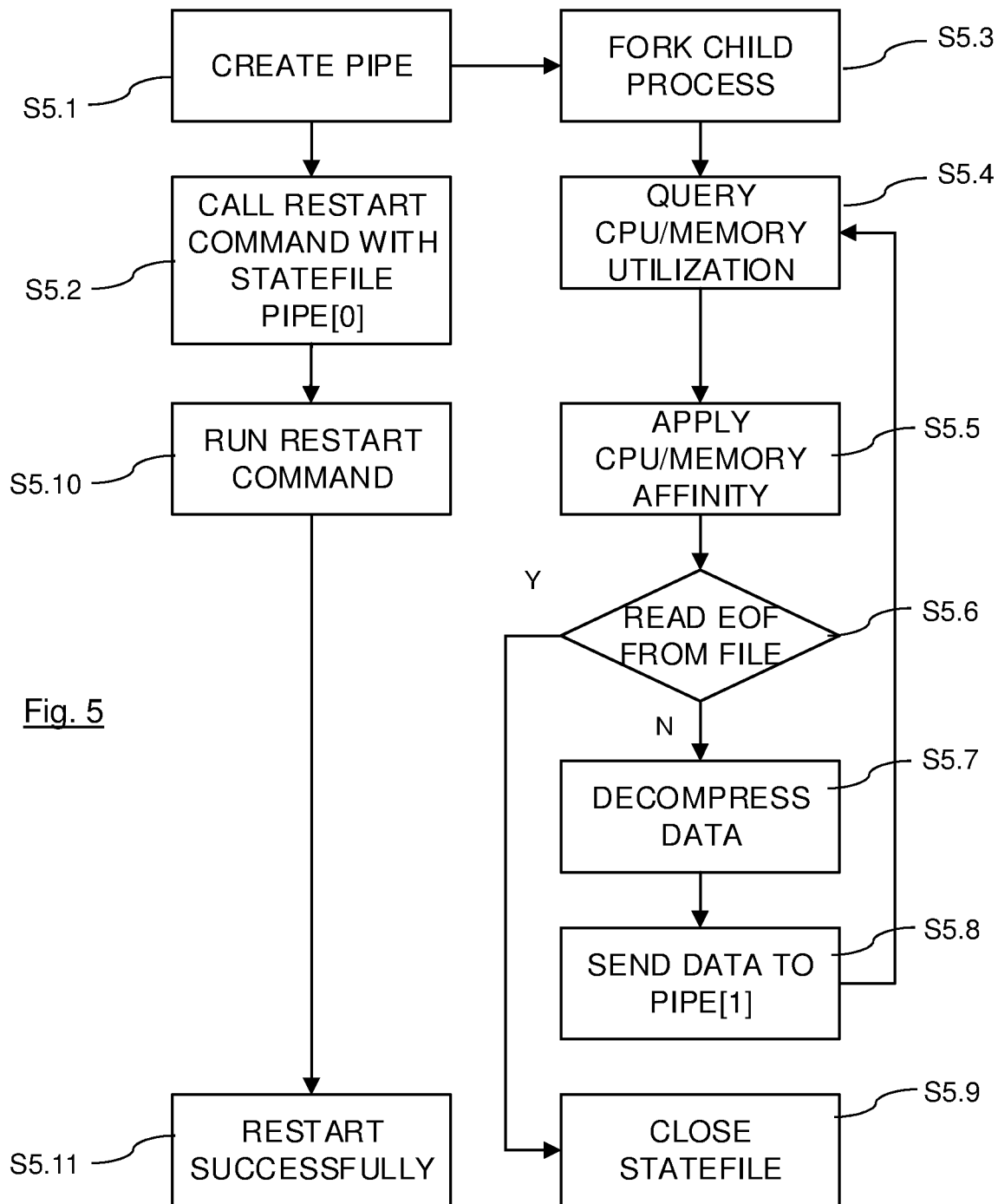
FIG. 5 is a flowchart illustrating an improved restart process.

FIG. 5 illustrates the improved restart process. In the current restart flow, the C/R supporting library calls the restart command and the container tool runs the restart command and just straightforwardly invokes the restart command after which the co-ordinated parallel tasks prepare for the resuming No compression took place in the original checkpoint process and so the statefiles are recalled in their uncompressed condition and these are used as the basis for the restart process. This greatly increases the amount of data that has to be stored and recalled and also increases the I/O traffic required to handle this data.

By contrast, in the improved checkpoint flow, the statefiles are captured and compressed, while the library handles the decompression for the statefiles during the restarting procedure. This vastly reduces the amount of data needed to be stored. In relation to the improved procedure of FIG. 5, the major steps are described as follows. At step S5.1, the library creates a pipe. At step 5.2, the library calls a restart command by passing in the opened pipe[0]. At step S5.3, the library forks a child process. At step 5.4, in the forked child process, the library queries the resource manager to retrieve CPU/memory utilization information. At step S5.5, the child process specifies the suitable CPU/memory affinity.

At step S5.6, the child process reads data from the specified statefile until it reads an EOF (end of file). At step S5.7, the child process decompresses a specific length of data retrieved from the statefile, according to the available resources determined above in step S5.4. The buffer size to use is set according to the currently available processing and memory resources. At step S5.8, the child process writes the decompressed data to pipe[1], and jumps to step S5.4. The restart command continuously reads pipe[0] until it get an EOF. Once the EOF is reached, then at step S5.9 the statefile is closed and eventually the statefile for the checkpoint is loaded into the relevant container to resume. Concurrently, the virtualised container tool runs the restart command at step S5.10 and completes the restart at step S5.11.

Figure 6:
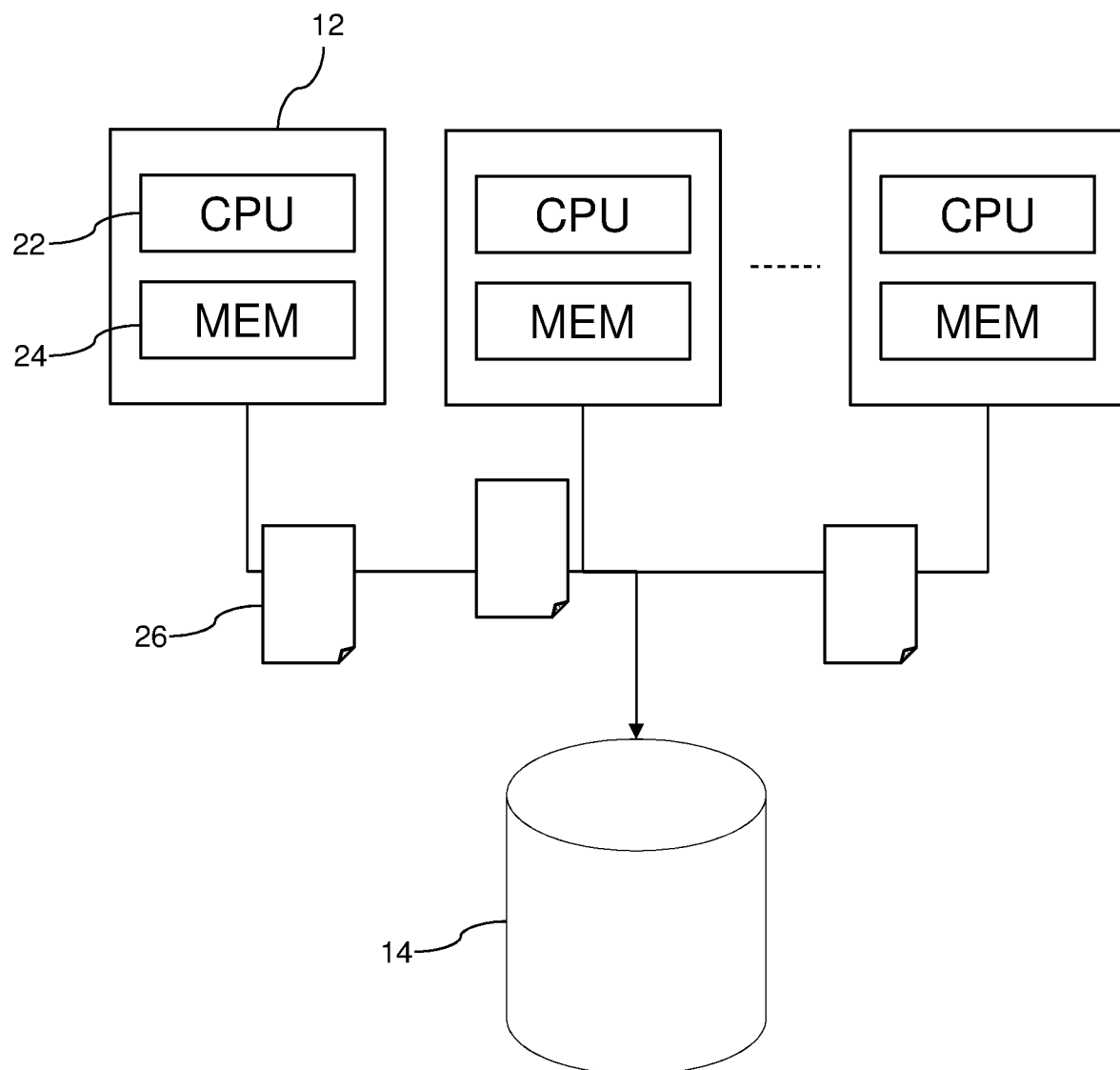
FIG. 6 is a further schematic diagram of the computing system.

FIG. 6 illustrates the hardware of the computer system, which comprises a series of connected nodes 12. Each node 12 comprises a processor 22 and a local memory 24. The method of performing a checkpoint on the set of connected processors 22 and memories 24 firstly comprises creating one or more statefiles 26 for one or more of the processors 22. In a container based approach, each processor 22 will have a respective container and each container will require a single statefile 26 to be created to perform the checkpoint process. A copy of the current image of each of the processors 22 will be copied into the respective statefile 26.

The resource manager then queries available processing and memory resources and allocates data from the statefiles 26 to the available resources. Essentially, a compression ratio is set according to the ascertained available processing resources and a buffer length is set according to the ascertained available memory resources. The allocated data is compressed and stored in the storage system 14. There is then repeated the querying, allocating, compressing and storing steps until all of the statefiles are compressed and stored. In this way, as available resources change over time then the compression ratio and buffer size are set to match the currently available resources. This provides efficient use of available resources without effecting other tasks.

When a restart is performed, this process is reversed. The compressed data is recalled to be decompressed to create the original statefiles 26. Again, the available resources are queried using the resource manager in order to determine an available buffer size to use. As much compressed data as possible is assigned to the available buffer and this compressed data is decompressed. This process is repeated until all of the compressed data has been decompressed and the original statefiles 26 can be reconstituted. The images represented by the statefiles 26 can then be used to restart the processors 22 back from the state captured in the previous checkpoint.

The invention claimed is:

1. A computer program product for performing a checkpoint on a plurality of connected processors in order to reduce a total size of one or more statefiles on a global share file system, the computer program product comprising:
   one or more computer-readable tangible storage medium and program instructions stored on at least one of the one or more tangible storage medium, the program instructions executable by a processor, the program instructions comprising:
   program instructions to create the one or more statefiles for each one of the plurality of connected processors on the global share file system, wherein the each one of the plurality of connected processors having a dedicated local memory;
   program instructions to query available processing resources of each one of the plurality of connected processors;
   program instructions to query available memory resources of the dedicated local memory corresponding to the each one of the plurality of connected processors;
   program instructions to allocate data from each one of the one or more statefiles to the available processing resources and the available memory resources;
   program instructions to set a first compression ratio based on the available processing resources of each one of the plurality of connected processors, wherein program instructions to set the first compression ratio corresponds to a lossless data compression algorithm comprising:
   program instructions to use an arithmetic coding algorithm as the lossless data compression algorithm when the first compression ratio as high;
   program instructions to use a dictionary compression algorithm as the lossless data compression algorithm when the first compression ratio is intermediate; and
   program instructions to use a run-length encoding algorithm as the lossless data compression algorithm when the first compression ratio is low;
   program instructions to set a length of a compression buffer based on the available memory resources;
   program instructions to compress the allocated data to the corresponding compression buffer of each one of the plurality of connected processors by applying the lossless data compression algorithm corresponding to the first compression ratio of each one of the plurality of connected processors;
   program instructions to store the compressed allocated data on the global share file system; and
   repeating program instructions to query, allocate, set, compress and store steps until each one of the one or more statefiles are compressed and stored on the global share file system.

2. The computer program product according to claim 1, further comprising:
   program instructions to write the data from the one or more statefiles to a data pipe, wherein program instructions to allocate the data from each one of the one or more statefiles to the available memory resources comprises program instructions to read the data from the data pipe.

3. The computer program product according to claim 1, wherein the each one of the plurality of connected processors having a dedicated local memory comprise a node, and the computer program product for performing the checkpoint is triggered from a master node communicating with all other nodes.

4. A computer program product for performing a checkpoint on a set of connected processors and memories in order to reduce a total size of a statefile on a global share file system, the computer program product comprising:
   one or more computer-readable tangible storage medium and program instructions stored on at least one of the one or more tangible storage medium, the program instructions executable by a processor, the program instructions comprising: creating the statefile for one or more of the processors on the global share file system;
   program instructions to allocate first data from the statefile to a compression buffer of each one of the one or more of the processors;
   program instructions to set a first compression ratio according to available processing resources of each one of the one or more of the processors, such that the first compression ratio is inversely related to the available processing resources of each one of the one or more of the processors, wherein program instructions to set the first compression ratio corresponds to a lossless data compression algorithm comprising:
   program instructions to use an arithmetic coding algorithm as the lossless data compression algorithm when the available processing resources of each one of the one or more of the processors is high;
   program instructions to use a dictionary compression algorithm as the lossless data compression algorithm when the available processing resources of each one of the one or more of the processors is intermediate; and
   program instructions to use a run-length encoding algorithm as the lossless data compression algorithm when the available processing resources of each one of the one or more of the processors is low;
   program instructions to set a first length of the compression buffer according to available memory resources, such that the length of the compression buffer is inversely related to the available memory resources of each one of the one or more of the processors; and
   program instructions to compress the allocated data from the compression buffer of each one of the one or more of the processors based on the first compression ratio, and saving the compressed first data to the statefile on the global share file system.

5. The computer program product according to claim 4, further comprising:
   program instructions to allocate second data from the statefile to the compression buffer;
   program instructions to set a second compression ratio according to available processing resources, such that the second compression ratio is inversely related to the available processing resources, wherein program instructions to set the second compression ratio corresponds to the lossless data compression algorithm comprising:
   program instructions to use the arithmetic coding algorithm as the lossless data compression algorithm when the available processing resources of each one of the one or more of the processors is high;

program instructions to use the dictionary compression algorithm as the lossless data compression algorithm when the available processing resources of each one of the one or more of the processors is intermediate; and program instructions to use the run-length encoding algorithm as the lossless data compression algorithm when the available processing resources of each one of the one or more of the processors is low;

program instructions to set a second length of the compression buffer according to available memory resources, such that the second length of the compression buffer is inversely related to the available memory resources; and program instructions to compress the allocated second data from the compression buffer based on the second compression ratio, and saving the compressed second data to the statefile.

6. The computer program product according to claim 5, wherein program instructions to set the second compression ratio according to the available processing resources comprises program instructions to lower the second compression ratio in response to an increase in CPU utilization, or vice versa.

7. The computer program product according to claim 4, repeating program instructions to allocate, set, compress, and save until all data from the statefile is compressed and saved.

8. The computer program product according to claim 4, wherein program instructions to set the first compression ratio and setting first length of the compression buffer comprises program instructions to dynamically adjust the first compression ratio and program instructions to dynamically adjust the first length of the compression buffer over time in response to a monitored change in the available processing resources and a monitored change in the available memory resources, respectively.

9. The computer program product according to claim 4, wherein the available processing resources and the available memory resources are determined at the time of allocating the first data to the compression buffer.

10. The computer program product according to claim 4, further comprising:

program instructions to write the statefile to a data pipe and wherein program instructions to allocate the first data from the statefile to the compression buffer comprises program instructions to read the first data from the data pipe.

11. The computer program product according to claim 4, wherein each processor and respective memory comprise a node, and the checkpoint process is run in parallel across multiple nodes.

12. A computer program product for performing a checkpoint and restart on a set of connected processors and memories in order to reduce a total size of a statefile on a global share file system, the computer program product comprising:

one or more computer-readable tangible storage medium and program instructions stored on at least one of the one or more tangible storage medium, the program instructions executable by a processor, the program instructions comprising:

program instructions to create the statefile for each one of the processors, wherein a current image of each processor is copied into their respective statefile on the global share file system;

program instructions to allocate first data from the statefile to a compression buffer for each one of the processors;

program instructions to determine, in runtime, processor utilization for each one of the processors and setting a first compression ratio according to the determined processor utilization for each one of the processors, wherein the first compression ratio is inversely related to the determined processor utilization for each one of the processors, wherein program instructions to set the first compression ratio corresponds to a lossless data compression algorithm comprising:

program instructions to use an arithmetic coding algorithm as the lossless data compression algorithm when the processor utilization for each one of the processors is low;

program instructions to use a dictionary compression algorithm as the lossless data compression algorithm when the processor utilization for each one of the processors is intermediate; and program instructions to use a run-length encoding algorithm as the lossless data compression algorithm when the processor utilization for each one of the processors is high;

program instructions to determine, in runtime, memory utilization and program instructions to set a first size of the compression buffer according to the determined memory utilization, wherein the first size of the compression buffer is inversely related to the determined memory utilization;

program instructions to compress the allocated first data from the compression buffer of each one of the processors based on the first compression ratio, and program instructions to save the compressed first data to the statefile on the global share file system;

program instructions to recall the compressed first data from the statefile on the global share file system;

program instructions to determining, in runtime, processor utilization and setting a first decompression ratio according to the determined processor utilization, wherein the first decompression ratio is inversely related to the determined processor utilization; and program instructions to determine, in runtime, memory utilization and setting a first size of a decompression buffer according to the determined memory utilization, wherein the first size of the decompression buffer is inversely related to the determined memory utilization.

13. The computer program product according to claim 12, further comprising:

program instructions to allocate second data from the statefile to the compression buffer;

program instructions to determine, in runtime, processor utilization for each processor and setting a second compression ratio according to the determined processor utilization, wherein the second compression ratio is inversely related to the determined processor utilization and corresponds to a lossless data compression algorithm comprising:

program instructions to use the arithmetic coding algorithm as the lossless data compression algorithm when the processor utilization for each one of the processors is low;

program instructions to use a dictionary compression algorithm as the lossless data compression algorithm when the processor utilization for each one of the processors is intermediate; and program instructions to use a run-length encoding algorithm as the lossless data compression algorithm when the processor utilization for each one of the processors is high;

program instructions to determine, in runtime, memory utilization and setting a second size of the compression buffer according to the determined memory utilization, wherein the second size of the compression buffer is inversely related to the determined memory utilization;

program instructions to compress the allocated second data from the compression buffer based on the second compression ratio, and saving the compressed second data to the statefile;

program instructions to recall the compressed second data from the statefile;

program instructions to determine, in runtime, processor utilization and setting a second decompression ratio according to the determined processor utilization, wherein the second decompression ratio is inversely related to the determined processor utilization; and program instructions to determine, in runtime, the memory utilization and program instructions to set a second size of a decompression buffer according to the determined memory utilization, wherein the second size of the decompression buffer is inversely related to the determined memory utilization.

14. The computer program product according to claim 12, repeating program instructions to allocate, determine, set, compress, and save until all data from the statefile is compressed and saved.

15. The computer program product according to claim 12, wherein program instructions to set the first compression ratio and program instructions to set the first size of the compression comprises program instructions to dynamically adjust the first compression ratio and program instructions to dynamically adjust the first size of the compression buffer over time in response to a monitored change in the processor utilization and a monitored change in the memory utilization, respectively.

16. The computer program product according to claim 12, wherein the processor utilization and program instructions to determine the memory utilization are determined at the time of allocating the first data to the compression buffer.

17. The computer program product according to claim 12, wherein each processor and respective memory comprise a node, and the checkpoint process is triggered from a master node communicating with all other nodes.

* * * * *